(12) United States Patent
Winzinger (10) Patent No.: US 8,985,988 B2
(45) Date of Patent: Mar. 24, 2015

(54) MEASURING DEVICE (75) Inventor: Frank Winzinger, Regensburg (DE)

(73) Assignee: Krones AG, Neutraubling (DE)

( * ) Notice: Subject to any disclaimer, the term of this patent is extended or adjusted under 35 U.S.C. 154(b) by 419 days.

(21) Appl. No.: 12/986,299

(22) Filed: Jan. 7, 2011

(65) Prior Publication Data

US 2011/0175246 A1    Jul. 21, 2011

(30) Foreign Application Priority Data

Jan. 15, 2010   (DE) .......................... 10 2010 000 941

(51) Int. Cl.
*B29C 49/04* (2006.01)
*B29C 49/78* (2006.01)
*B29C 47/92* (2006.01)
*B29C 49/06* (2006.01)

(52) U.S. Cl.
CPC ................ *B29C 49/78* (2013.01); *B29C 47/92* (2013.01); *B29C 49/783* (2013.01); *B29C 2949/78025* (2013.01); *B29C 2949/78117* (2013.01); *B29C 2949/78151* (2013.01); *B29C 2949/78184* (2013.01); *B29C 49/06* (2013.01)
USPC ............. 425/169; 264/40.1; 702/104; 702/85

(58) Field of Classification Search
USPC .................................. 264/40.1; 425/169, 170
See application file for complete search history.

(56) References Cited

U.S. PATENT DOCUMENTS

| 5,902,526 A * | 5/1999 | Davis et al. ................... 264/40.1 |
| 2004/0226392 A1* | 11/2004 | McNally ....................... 73/866.1 |
| 2008/0257039 A1* | 10/2008 | Thiel et al. ................... 73/382 R |

FOREIGN PATENT DOCUMENTS

| CN | 1462231 A | 12/2003 |
| CN | 101623925 A | 1/2010 |
| DE | 102007022386 A1 | 11/2007 |
| EP | 1396330 A1 | 3/2004 |
| EP | 2143547 A2 | 1/2010 |
| EP | 102008032121 A1 | 1/2010 |
| JP | 2000062013 A | 2/2000 |

OTHER PUBLICATIONS

"Agent QC," Sensor Wireless Inc., Industry IDS, Inc., 2011, http://www.idspackaging.com/packaging/us/agent_qc/1931/products.html.
German Search Report for DE 102010000941.5, dated Jan. 15, 2010.

* cited by examiner

*Primary Examiner* — Galen Hauth
(74) *Attorney, Agent, or Firm* — Marshall, Gerstein & Borun LLP (57) ABSTRACT

A measuring device for determining at least one parameter value for the operation of a blow molding machine, a filling machine, and/or a labeling device, and having at least one measuring element for determining the at least one parameter value and a preform dummy, and disposing the at least one measuring element in and/or at the preform dummy.

8 Claims, 9 Drawing Sheets

MEASURING DEVICE

CROSS-REFERENCE TO RELATED APPLICATION

The present application claims the benefit of priority of German Application No. 102010000941.5, filed Jan. 15, 2010. The entire text of the priority application is incorporated herein by reference in its entirety.

FIELD OF THE DISCLOSURE

The present disclosure relates to a measuring device and a method for determining at least one parameter value for the operation of a blow molding machine, a filling machine, and/or a labeling device.

BACKGROUND

For the correct operation of a blow molding machine, a filling machine, and/or a labeling device, it is normally necessary to determine the values of various parameters relevant for the operation of the plants and to correct them, if necessary. For example, it is necessary to know and adjust the blowing pressure of a blow molding machine.

As many parameters can comprise values variable in time and space, a plurality of stationary sensors are often used. However, this has the disadvantage that a lot of material and a complex circuit are required to read out the values measured by the sensors and process them in a control element.

SUMMARY OF THE DISCLOSURE

Therefore, it is one aspect of the present disclosure to provide a measuring device and a method which permits an easier determination of at least one parameter value for the operation of a blow molding machine, a filling plant, and/or a labeling device.

The measuring device according to the disclosure for determining at least one parameter value for the operation of a blow molding machine, a filling machine, and/or a labeling device comprises at least one measuring element for determining the at least one parameter value, and a preform dummy, wherein the at least one measuring element is disposed in and/or at the preform dummy.

The preform dummy can be moved through the blow molding machine, the filling machine, and/or the labeling device, while the measuring element can determine the value of at least one parameter. Thereby, a place- and/or time-dependent parameter can be measured in a facilitated manner.

Preforms are usually used for the manufacture of plastic containers by means of a blow molding machine. For this, the preforms are introduced into the blow molding machine, optionally heated or otherwise pretreated, and then subjected to compressed air, so that a portion of the surface area of the preform is expanded to a blow mold.

Preform dummy here designates an element which has the shape of a preform. A preform dummy can also have the same dimensions as a preform. In particular, a preform dummy can also comprise the same material as a preform. The preform dummy can also correspond to a preform. In particular, the preform dummy can be essentially round.

In other words, the measuring device can be embodied in the form of a preform, that means it can have the geometric shape of a preform. It is thereby possible to move the measuring device at least partially with the same transport device with which the articles to be processed are also moved.

The preform dummy can have a mouth region or a mouth, where in particular the mouth region comprises an opening of the preform dummy facing outwards.

It would also be conceivable that the preform dummy comprises two mouths with openings facing outwards.

The preform dummy can comprise a supporting ring by means of which the measuring device can be introduced into a transport device of the blow molding machine, the labeling device, and/or the filling machine. In other words, the supporting ring can be used for handling. For example, the measuring device can be hung with the supporting ring into guide rails and be moved for example with the aid of air, gripped inside by means of retaining pins, and/or gripped outside by means of clamps. That means the measuring device can be moved through the blow molding machine, the filling machine, and/or the labeling device by neck handling. As an alternative or in addition, base handling, in particular in the labeling device or with a packer in which, among other things, several measuring devices are arranged to form a pack, are possible.

In one embodiment, only the mouth of the preform dummy has the same contour or shape as a preform which is used for the production of bottles. In this case, the length of the preform dummy can be in particular longer than that of the preforms which are employed in the producing operation, in particular by means of the transport device.

An inner diameter of the mouth and/or an outer diameter of the mouth at the preform dummy can be variably adjustable. Thereby, the same preform dummies can be employed when the format of the filling plant is changed to other bottle sizes. This can be accomplished, for example, by attaching or screwing on additional format parts, such as sleeves. However, it would also be conceivable to exchange the complete mouth. For this, the mouth can be connected to a basic body of the preform dummy by means of a thread.

The inner surfaces or outer surfaces of the preform dummy can comprise snap-in elements serving for snapping-in the applied transport devices. The snap-in elements can be in particular projections or grooves. In this manner, a higher weight of the measuring device compared to that of the preforms employed in the production can be compensated, and slipping can be prevented, in particular during transport by means of an internal gripper which usually only grips with a non-positive fit. In other words, the preform dummy can comprise means for a positive pick-up for transport.

Moreover, the measuring device can thereby also at least partially be processed by an element or a treatment unit by means of which the articles to be processed are also processed. Such an element can be, for example, an oven, a stretch rod, a blow nozzle, a filling element, a closing element and/or a labeling module. That means, the elements can represent any type of treatment units, further examples are transport clamps (external grippers), transport mandrels (internal grippers), heating means, sterilization units, feed valves, rinsing nozzles or lances (for example for rinsing) or blow stations for expanding preforms with associated blow molds, blow nozzles or stretch rods, but also closing heads or labeling aggregates (e.g. rotary tables, label dispensers). The dimensions of the measuring device, in particular of the preform dummy, can correspond to the dimensions of a preform or the dimensions of an article to be processed in the labeling device and/or the filling machine, in particular a bottle. Other sizes for the preform dummy are also basically possible, where a maximum/minimum size is determined by the maximum/minimum dimensions of a transport path through the blow molding machine, the filling machine, and/or the labeling device. Exemplary dimensions for an inner diameter of the mouth are 8 mm to 50 mm, for an outer diameter of the mouth 9 mm to 51 mm, for an outer diameter of a supporting ring 10 mm to 52 mm, and for the total length of the preform dummy 30 mm to 500 mm. An outer diameter at the body of the measuring device can be within a range of 8 mm to 400 mm. A height of a mouth (from the region of the supporting ring in the direction of the closing section to the upper edge, that means to an opening of the preform dummy facing outwards) can be between 4 mm and 100 mm. However, a supporting ring is not absolutely necessary. The preform dummy can also comprise a closing ring disposed between the supporting ring and the opening facing outwards. However, the supporting ring could also assume the function of the closing ring.

The preform dummy can comprise an outer and/or an inner surface, the at least one measuring element being disposed at the outer and/or the inner surface.

The measuring device can moreover comprise a transmitting element for transmitting the at least one parameter value determined by the measuring element to an evaluation element. Thereby, the parameter value can be transmitted directly to an evaluation element after measurement and be used there to control the plant.

The transmitting element can in particular correspond to an RFID chip, a WLAN transmitter, a Bluetooth or an infrared element.

The measuring device can moreover comprise a storage element for storing the at least one parameter value determined by the measuring element. Thereby, one or several measured values can be stored in the storage element, and after the passage of the measuring device through the blow molding machine, the filling machine, and/or the labeling device, this storage element can be read out by a read-out device, and the stored measured values can be either supplied to an external storage or an evaluating element for further processing.

The storage element can be in particular a digital storage medium, where the digital storage medium in particular operates according to the flash storage principle.

The measuring device can in particular be an interface, in particular a USB interface, for connecting the storage element with an evaluation element and/or an external storage element.

The measuring device can moreover comprise a processor element, in particular a CPU, for processing the parameter value determined by the measuring element. The processor element can also be a programmable logic controller (PLC).

The measuring device can moreover comprise a power supply element for supplying electric energy to the at least one measuring element, the transmitting element, the storage element, the processor element and/or the interface. In other words, the measuring device can have its own power supply. The power supply element can be in particular a battery, for example a button cell.

The at least one parameter value can be a pressure value, a temperature value, a value of a force, a value of a moment, a position value, a period, a flow rate, a format value, a speed value, a radiation value (e.g. microwave radiation), in particular a radiation intensity value, and/or a number of germs. In other words, the at least one measuring element can be embodied such that it can measure a pressure value, a temperature value, a value of a force, a value of a moment, a position value, a period, a gas or liquid quantity a volume value), a speed, a radiation intensity or field strength, and/or a number of germs. The measuring device can in particular comprise several measuring elements, where each of the measuring elements can determine or measure one or several ones of the above mentioned values. In particular, the measuring device can comprise several measuring elements of the same type.

The format value here stands for certain geometric or chemical values which relate to one or several geometric values, or a material composition of bottles or preforms to be produced, which in turn can be associated to certain format parts, in particular treatment units, of the blow molding machine, the filling machine, and/or the labeling device.

The at least one parameter value can in particular correspond to a physical treatment parameter of containers (preforms and/or bottles) in a blow molding machine, a filling machine (filler), and/or a labeling device.

The measuring device can have pillars to be suited for upright transport.

The measuring device can have a deformable mouth region. By this, for example an internal gripper clamping, e.g. a heating spigot clamping, can be analyzed. As pressure sensors for this, in particular piezoresistive/electric pressure sensors can be used.

The measuring device can be at least partially made of a, ceramics and/or heat resistant plastics.

The measuring device can moreover comprise one or several adjustment means attached in and/or at the preform dummy which are embodied such that during the transport of the measuring device through a plant, certain treatment units can be adjusted to another format.

For this, certain treatment units could be for example provided with at least two stop notches. By the treatment of the preform dummy, the treatment units snap into certain positions that are required for a provided container format or preform format. This can be done by a certain geometric shape of the preform dummy at a suited position. It would also be conceivable to do without measuring elements at the preform dummy and to only adjust certain treatment units to another format by means of adjustment means attached to the preform dummy during transport through certain machines of a filling plant. In particular, an active or passive transmitting element can be disposed at and/or in the preform dummy (e.g. an REID chip) which transmits the corresponding required format information for an automatic format change to the individual machines of a filling plant. In particular, no measuring elements are arranged at the preform dummy for such an application.

The disclosure moreover provides a method for determining at least one parameter value for the operation of a blow molding machine, a filling machine, and/or a labeling device, comprising the steps of providing an above-described measuring device, introducing the measuring device into the blow molding machine, the filling machine, and/or the labeling device, and determining the at least one parameter value.

The measuring device can be in particular moved through the blow molding machine, the filling machine, and/or the labeling device. During the movement of the measuring device through the blow molding machine, the filling machine, and/or the labeling device, the at least one measuring element of the measuring device can detect the at least one parameter value.

The measuring device can be moved through the blow molding machine, the filling machine, and/or the labeling device at least partially by a transport device by means of which the articles to be processed are moved in operation. Thereby, the method can be facilitated as no separate or additional transport devices for the measuring device must be provided.

The measuring device can be processed in the blow molding machine, the filling machine, and/or the labeling device at least partially by an element by means of which the articles to be processed are processed in operation. Thereby, it is possible to determine performance parameters of the processing elements.

Several measuring devices can be introduced into the blow molding machine, the filling machine, and/or the labeling device, where in particular each of the measuring devices determines the value of another parameter.

Moreover, at least two measuring devices could be introduced into the blow molding machine, the filling machine, and/or the labeling device and determine the value of the same parameter. Then, the difference between the determined parameter values can be determined.

Thereby the time history of a parameter value can be determined. Each of the measuring devices can in particular comprise one or several ones of the above-described features.

The method can moreover comprise the transmission of the at least one parameter value to an evaluation element. In particular, the transmission of the at least one parameter value can be effected via WLAN, Bluetooth, infrared or radio waves. Moreover, read-out elements can be provided at predetermined positions of the blow molding machine, the filling machine, and/or the labeling device or between them, the read-out elements reading out or querying the at least one determined parameter value from the measuring device by means of WLAN, Bluetooth, infrared or radio waves.

As an alternative, the measuring device can be discharged from the blow molding machine, the filling machine, and/or the labeling device and supplied to a read-out unit. In the read-out unit, a storage element of the measuring device can be read out.

The at least one determined parameter value can be used for controlling the blow molding machine, the filling machine, and/or the labeling device. For example, an adjustment of the plant can be corrected based on the at least one determined parameter value. In particular, individual heating stations, blow stations, feed valves, and/or labeling aggregates can be controlled on the basis of the at least one determined parameter value.

Here, manipulated variables of the heating stations or the blow stations can be variable. For this, the filling plant, that means a system comprising, a blow molding machine, a filling machine, and/or a labeling device, can comprise a control unit which is designed such that it controls the manipulated variables in response to one or several measured values. In particular, the control unit can comprise an assignment means which assigns manipulated variables to predetermined measured values. Further machines can also be assigned to the system.

In one plant, the individual machines of the blow molding machine, the filling machine, and/or the labeling device can comprise several treatment units which treat the preforms or containers, respectively, in the same manner. These can be arranged in particular one next to the other in individual carousels.

One or several treatment units of the blow molding machine, the filling machine, and/or the labeling device, in particular similar treatment units, can be controlled, in particular independent of each other, based on the at least one determined parameter value.

The control unit can be designed such that it assigns one or several measurements exactly to the treatment unit that has performed the treatment. In this manner, individual treatment units of the same type (in particular on the same carousel) can be controlled differently. In particular, switching times for pressures in the blow molding machine, stretching parameters of certain blow molds, and heating powers of certain heating stations and certain heating layers can be thereby determined and controlled.

Among other things, it is in this respect advantageous to provide at least as many measuring devices in one measuring cycle in the filling plant as there are treatment units on the carousel with the most treatment units. However, it would also be conceivable to provide a return of individual measuring devices and at least one further cycle where the same measuring devices are treated by those treatment units of a carousel by which they were not treated in a first cycle.

The measuring device can also display individual treatment units to the operator (error message) which have a wrong format for the containers used in the production to follow.

In particular, at least one measuring device is passed through at least one machine of the plant before the start of a production.

In a further embodiment, a prestressing pressure or a counter pressure, but also a vacuum within a filling machine can be measured and/or controlled. However, it would also be conceivable to perform a flow measurement of certain gases with which the measuring device is treated, for example of introduced carbon dioxide during and/or after a Filling process, or ionized air during sterilization. The flow can also be controlled. In the flow measurement of gases, the preform dummy can be provided with a second opening for the escape of gases. The preform dummy can have a flow meter for this. Equally, temperatures during sterilization, filling with a product, and/or rinsing can be detected and/or controlled.

The present disclosure moreover provides a system, comprising a blow molding machine, a filling machine and/or a labeling device as well as a discharge and/or introduction element for discharging or introducing an above-described measuring device.

The system can moreover comprise a control element which is embodied such that the at least one determined parameter value can be used for controlling the blow molding machine, the filling machine and/or the labeling device as described above.

BRIEF DESCRIPTION OF THE DRAWINGS

Further features and advantages will be described below with reference to the exemplary figures. In the figures.

DETAILED DESCRIPTION OF THE PREFERRED EMBODIMENT

Figure 1:
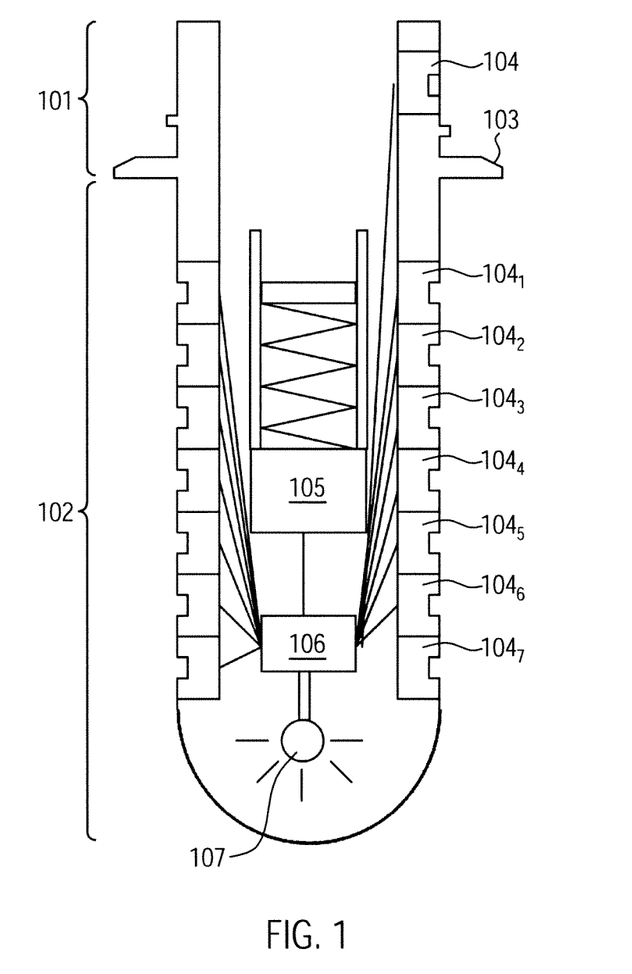
FIG. 1 shows a first exemplary measuring device.

FIG. 1 shows an exemplary measuring device for determining at least one parameter value for the operation of a blow molding machine, a filling machine, and/or a labeling device. The measuring device has a preform geometry. In other words, the measuring device is embodied in the form of a preform, in particular a plastic preform of a blow molding machine. The measuring device can be at least partially made of a light metal, ceramics and/or heat resistant plastics. The sensors can consist of the respective commercially available materials and be connected with the preform dummy.

The exemplary measuring device comprises a mouth region 101 and a case region 102. Measuring elements are arranged at the surface and within the preform dummy in FIG. 1. In particular, pyrometers 104 and 104-1 to 104-7 are arranged at the preform dummy. These pyrometers 104 and 104-1 to 104-7 permit the determination of a temperature, for example in a heating tunnel of a blow molding machine. As an alternative or in addition, pyrometers can also be provided inside the measuring device to measure the heating power of immersing heating elements. The measuring device cannot only be used for measuring the temperature in a heating tunnel, but also, for example, for measuring the temperature in a heating jacket. Sensors for measuring the intensity of microwave radiation can also be provided.

The exemplary measuring device in FIG. 1 moreover comprises a stretch rod force sensor 105. Moreover, elements by means of which the contact force of a blow nozzle is measured can be provided.

FIG. 1 moreover shows a memory chip 106 in which the measured data of the measuring elements can be stored, as well as a transmitting antenna 107 which permits to transmit the stored and measured data to an evaluation element. The measuring device can moreover comprise a processor element, in particular a CPU, for processing the parameter values determined by the measuring elements.

The preform dummy in FIG. 1 moreover comprises a supporting ring 103 by means of which the measuring device can be introduced, for example, into a transport device of the blow molding machine, the labeling device, and/or the filling machine. The mouth region 101 can also comprise a thread for a vessel closure. The supporting ring 103 is in particular used for exactly positioning the preform dummy at transport devices.

The mouth region 101 can also be embodied to be deformable. By this, for example the heating mandrel clamping can be analyzed. It can be in particular thereby determined whether gripping is performed centrically and/or perpendicularly.

The measuring device in FIG. 1 comprises several elements for temperature measurement, that means for determining a temperature value, as well as an element for measuring the stretch rod force of a blow molding machine. However, many other parameters for which a value can be determined with the aid of a corresponding measuring element are possible.

For example, the application of energy in various heating layers in the oven of a blow molding machine, a preblowing pressure, an intermediate blowing pressure, a final blowing pressure, a contact force of a blow nozzle, the time of the beginning of the preblowing pressure, the duration of the preblowing pressure and/or the consumed amount of air can be determined. With hot-filling machines, the rinsing time can be determined. If after rinsing, a reference quantity of heat is still too high, the rinsing time can be increased thereupon.

The duration of a heating time can be detected in the form of a heating power-time diagram. In particular, the heating time can be determined and controlled in individual horizontal or vertical layers. Moreover, the force with which transfer clamps act on the measuring device can be determined. This force has a direct influence on wear. Moreover, a measuring element for level control, for recording a march of pressure at handling points, for measuring a centrifugal force at rotary machines, for determining a filling level/filling volume of a product/sterilization means/quantity of nitrogen (H2O2/peracetic acid), for measuring temperatures in a blow mold (neck cooling), for determining a clamping force of the blow mold, for measuring the closer's contact pressure and torque, and/or for measuring a quantity of heat withdrawn by bottom aftercooling can be provided.

An angle of rotation-time diagram (preferential heating) can be determined, in particular with servo-driven heating mandrels. By means of optical sensors, a label position can be determined.

The position of an article in a pack can also be determined, and a robot can be adjusted such that an article is arranged at the correct position in a pack. In other words, a measuring element for determining a position value can be provided. This can be done in line, that means during production, or off line, that means before the production or after a production stop. In particular in the in line case, a measured position value can be transmitted to a robot and the latter can be correctly adjusted or calibrated, respectively. Here, it can be advantageous for the preform dummy to comprise pillars to be suited for transport in base handling (on conveying belts for packs).

The measured values of the measuring device can be used to control the plant, in particular to adjust various performance parameters. For example, the heating power of various heaters in the oven, the speed of a servo drive for a stretch rod, the power (current) the coils of a linear drive of a stretch rod draw, a mandrel pressure control for the preblowing pressure, a mandrel pressure control for the intermediate blowing pressure, the compressor power and/or a mandrel pressure control for the final blowing pressure (desired: as little final blowing pressure as possible), and/or a mandrel pressure control for the pressure pad pressure of a blow mold can be controlled.

Moreover, the speed or the torque of a servo drive or a mandrel pressure control for the drive of a stretch rod and/or a blow nozzle, the switching time for a valve for the beginning of the preblowing pressure, switching times for a valve for the duration of the preblowing pressure, and/or switching times for a rinsing valve in hot-filling machines can be adjusted. An operator can determine a pressure-time target curve (maximum/minimum values at certain points in time) which can be used for control.

Moreover, the duration of the heating time for preforms in the heating station can be determined (here, too, an operator can determine a target curve for controlling), the valve switching of the sterilization media/filling media can be controlled (point in time for opening/closing, pressure and volume flow rate (outlet) of the valve), the valve switching for mixing apparatuses can be controlled (for product (CO2 concentration), or concentration of the sterilization media), a performance adjustment of the plant or individual machines (in bottles per hour) can take place, the angle of rotation-time rotation of the servo drives of heating mandrels (preferential heating) can be adjusted, in particular with servo-driven heating mandrels, the servomotor movement for the adaptation of label positions can be adjusted, and/or temperature apparatuses can be adjusted to required temperatures for the blower air, media for blow mold tempering or the product.

To be able to exactly control temperature distribution within a mouth region of the preforms within the heating means of a blow molding machine, a further possibility can be to control an exact point in time for lifting or lowering a shield for the mouth region of preforms. The shield usually consists of sleeves or plates arranged approximately at the level of the supporting ring (in most cases just below it) of the preforms. The shields serve as barrier for heat radiation and accompany the preform during the transport through the heating device. However, it can happen that material just underneath the supporting ring of the preform is not sufficiently heated and is thus, for example, not stretched along in the subsequent blowing process, and the wall thickness of the containers is not sufficiently thick at certain points. Therefore, it can be necessary to remove the shield at the end of the heating device from the supporting ring. While the region just underneath the supporting ring is heated, the mouth region of the preforms can thus at the same time remain relatively cool, as just before the expansion process, there is no more time for heat being transferred from the region just underneath the supporting ring to the remaining mouth region. With time control where the mouth region of the preforms is protected by the shield, it would also be conceivable that not the shields, but the pick-up mandrels lift and lower and the region just underneath the supporting ring becomes accessible for radiation in this manner.

One or several ones of the above mentioned adjustments can be performed on the basis of the at least one determined parameter value.

The adjustment or control of the machines can be performed by an operator and/or via an automatic control loop. Control can be in particular performed by a control element, for example a programmable logic controller (PLC) or an operator PC.

Figure 2:
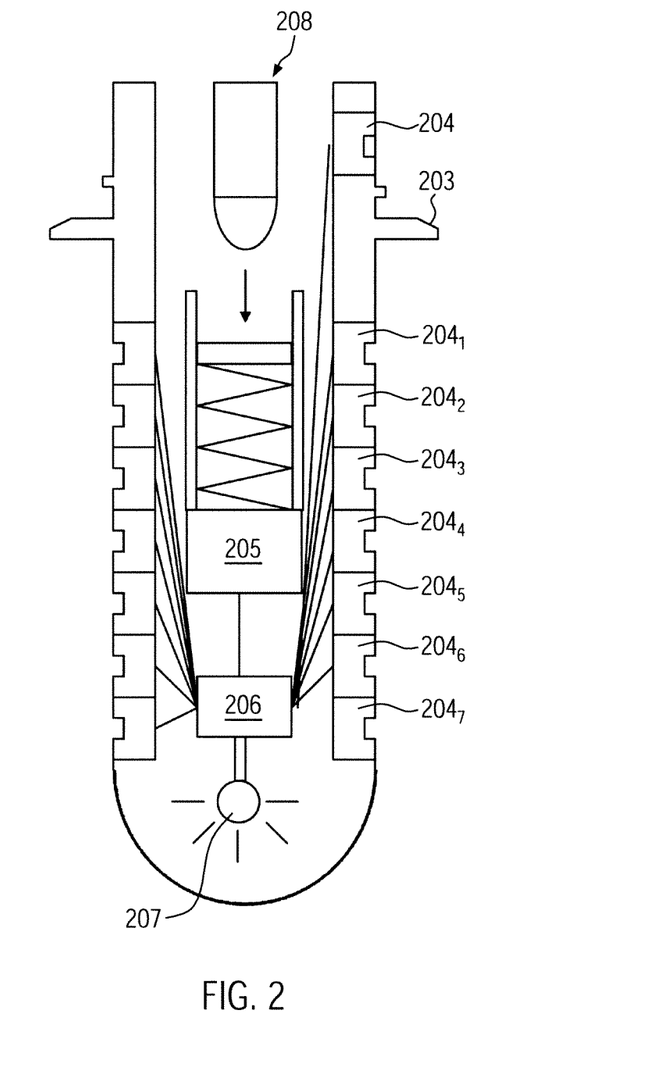
FIG. 2 shows a second exemplary measuring device.

FIG. 2 shows the exemplary measuring device of FIG. 1, where moreover a stretch rod 208 of a blow molding machine which is introduced into the measuring device is shown. By means of the stretch rod force sensor 205, it is possible to perform a path-time-force measurement. For example, the stretching speed can also be determined. The results of the measurement can be stored on a memory chip 206 and transmitted to an external evaluation element via a transmitter 207. Moreover, the measuring device comprises several temperature measuring elements or pyrometers 204, by means of which, for example, the application of energy in various heating layers in the oven of the blow molding machine can be determined.

Figure 3:
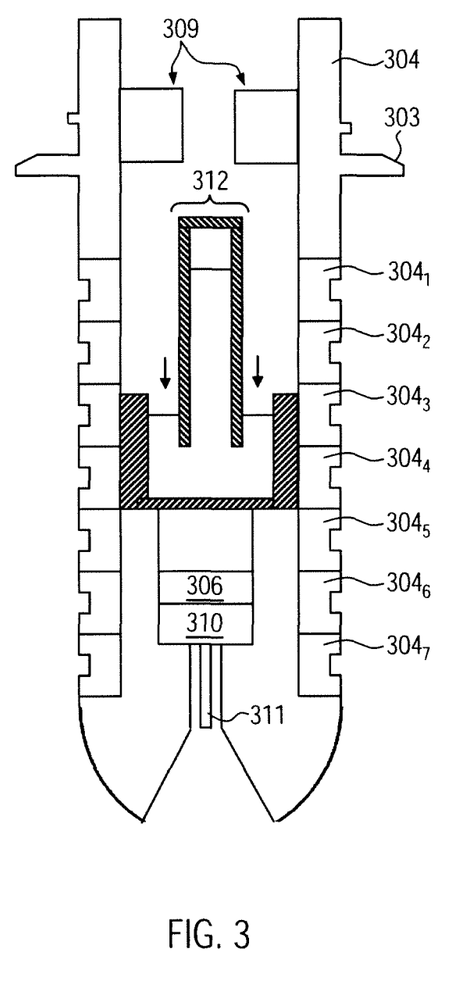
FIG. 3 shows a third exemplary measuring device.

FIG. 3 shows another exemplary measuring device, comprising several temperature measuring elements 304 as well as a pressure sensor (mercury column) 312. The arrows in FIG. 3 indicate the air pressure, in particular the blowing pressure in a blow molding machine. A projection 309 is shown in the mouth region of the preform dummy of the measuring device. This projection or placing pad 309 serves to prevent a stretch rod from being moved onto the measuring instruments. Simultaneously, compressed air can be introduced into the measuring device through a through hole in the projection 309.

The exemplary measuring device of FIG. 3 moreover comprises a memory chip 306 for storing the parameter values detected by the measuring elements, as well as a battery 310, in particular a button cell, for the power supply to the measuring device. Moreover, a USB port 311 is shown in FIG. 3 by means of which the measuring device can be connected to a read-out element and by means of which data stored at the memory chip 306 can be transmitted to an evaluation element, in particular manually, that means by an operator.

Figure 4:
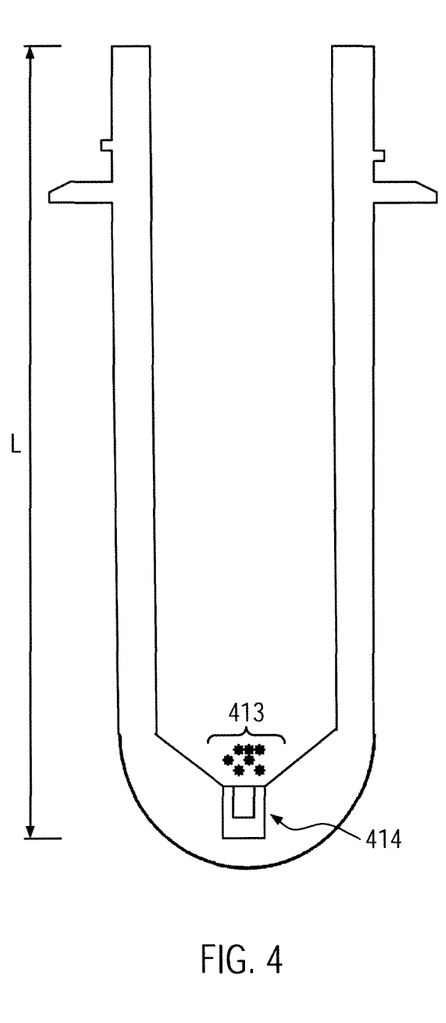
FIG. 4 shows a fourth exemplary measuring device.

FIG. 4 shows another exemplary measuring device, comprising a measuring element 414 for determining the number of germs. Here, some germs 413 are illustrated. In this case, the measuring dummy can comprise a length L and a diameter corresponding to the length or the diameter of an article or container, respectively. The length L can be in particular the maximum length a measuring device can have. The maximum length can be determined, for example, by a lower limit in a blow molding machine, in particular in the oven of a blow molding machine, or by a bottom mold in the blow mold. By the maximum length L, cleaning/sterilization at the bottom can also be simulated or checked, respectively.

The exemplary measuring device of FIG. 4 can be used for checking the aseptic condition from the blow molding machine (optionally via the labeling machine) to the filler/closer. If the demanded values as concerns the germ number are not observed, an error message can be sent to a control element, and a warning can be output to an operator, or concentrations or blow-in pressures of sterilization media (hydrogen peroxide, peracetic acid) or blow-in positions of sterilization units can be adjusted.

Figure 5:
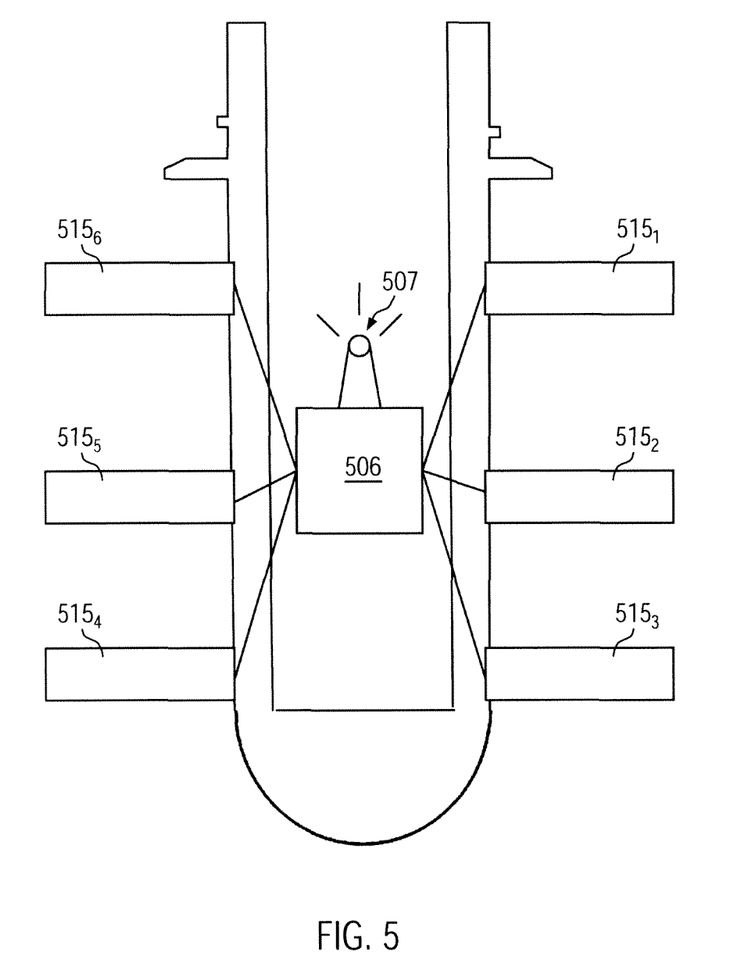
FIG. 5 shows a fifth exemplary measuring device.

FIG. 5 shows another exemplary measuring device, comprising several measuring tapes 515-1 to 515-6 which are used for measuring the clamping force of a blow mold. The clamping force of the blow mold should be greater than the force generated by the blowing pressure and acting to the outside. The measuring tapes can have a thickness of less than $\frac{1}{10}$ mm. As pressure sensors 515, piezoresistive/electric pressure sensors can be in particular used. The measuring tapes 515 can also be used to determine the temperature of the blow mold. The measuring device moreover comprises a storage element 506 and a transmitting element 507 for transmitting the measured values to an evaluation element or a control element, respectively. As an alternative or in addition to the storage element 506, a CPU can also be provided.

It would be theoretically conceivable that for a measurement of the clamping force of a blow mold, no measuring device is used as it is described here. One could also attach the sensors at the blow mold itself. In this manner, the clamping force could also be used for controlling the pressures present in the blow molding machine. For example, the pressure which acts on a pressure pad of a blow mold can be minimized. As a consequence, compressed air can be saved.

Figure 6:
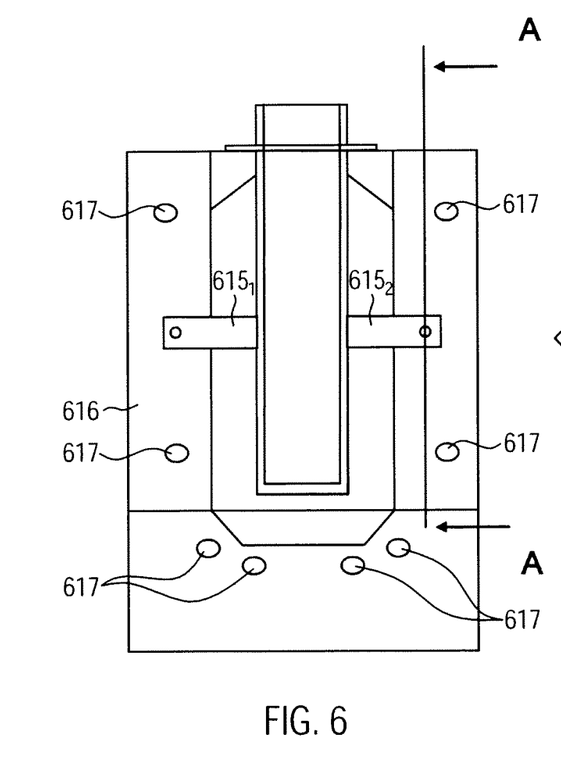
FIG. 6 shows a cross-section of a sixth exemplary measuring device in a blow mold.
Figure 7:
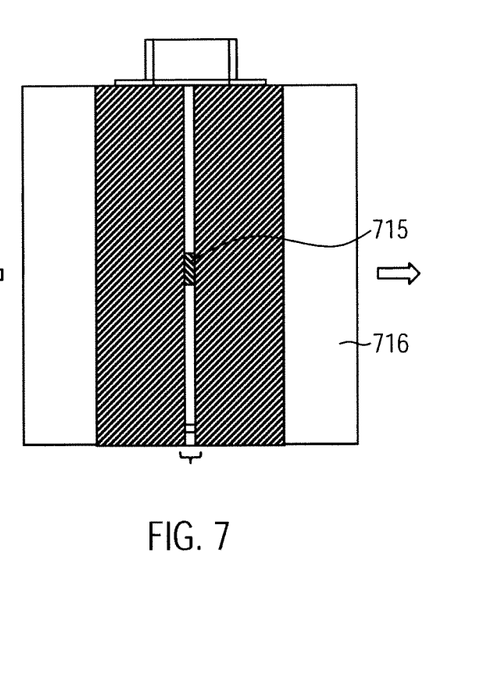
FIG. 7 shows a second cross-section of the sixth exemplary measuring device in a blow mold.

FIGS. 6 and 7 show exemplary cross-sections of a measuring device in a blow mold 616 and 716, respectively. The exemplary measuring device comprises measuring tapes 615 and 715, respectively, for measuring the clamping force of the blow mold 616, 716. If the clamping force is too high, the blowing pressure which acts on a pressure pad arranged between a contour-imparting shell mold and a support for the same can be reduced. If the force is too small, individual blow molds 616, 716 can be adjusted to a higher pressure pad force level. If the force is nevertheless not increased, an error message can be output to an operator. In FIG. 6, a floor mold that can be added from the bottom is moreover shown, as well as bores 617 for tempering media. FIG. 7 shows a section along the A-A axis of FIG. 6. The two arrows in FIG. 7 indicate the opening movement of the two blow mold halves. The mold gap between the blow molds should be smaller than 0.5 mm if no pressure acts on the pressure pad. If compressed air acts on the pressure pad, the mold gap should be closed.

Figure 8:
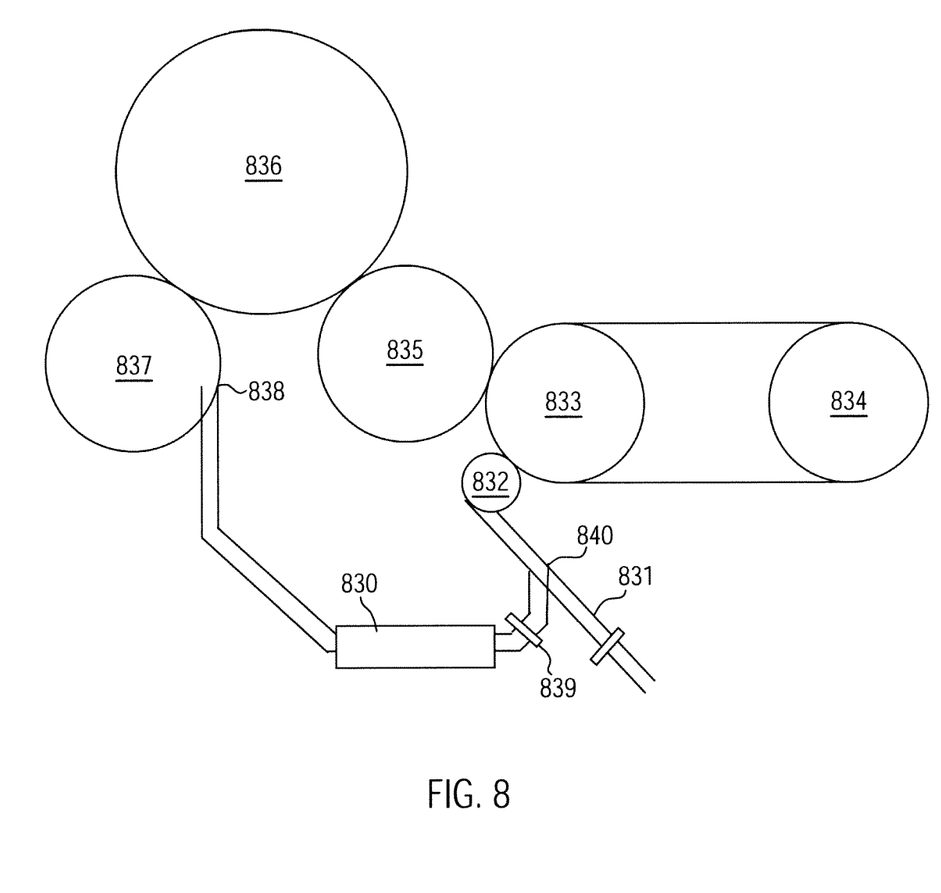
FIG. 8 shows an exemplary device, comprising an introduction means for introducing an exemplary measuring device.

FIG. 8 shows an exemplary system in which an above-described measuring device can be used. In particular, one or several measuring device(s) can be guided in a vertical conveyor 830 to a buffer section which has a stopper 839 at its end. If required, this stopper 839 can be deactivated, and a measuring device can be introduced, for example into the normal buffer section 831 for preforms via a lock 840. The measuring device can be, for example, introduced into the blow molding machine 833, 834, 835, 836 via the normal buffer section 831 and feeding wheels 832. The measuring device can be also discharged again from the exit wheel 837 at a discharge point 838. However, the discharge point 838 can also be provided or attached at another position of the system.

The measuring devices can in particular be introduced into the blow molding machine 833, 834, 835, 836 at fixed or predetermined time intervals, in particular regularly.

Figure 9:
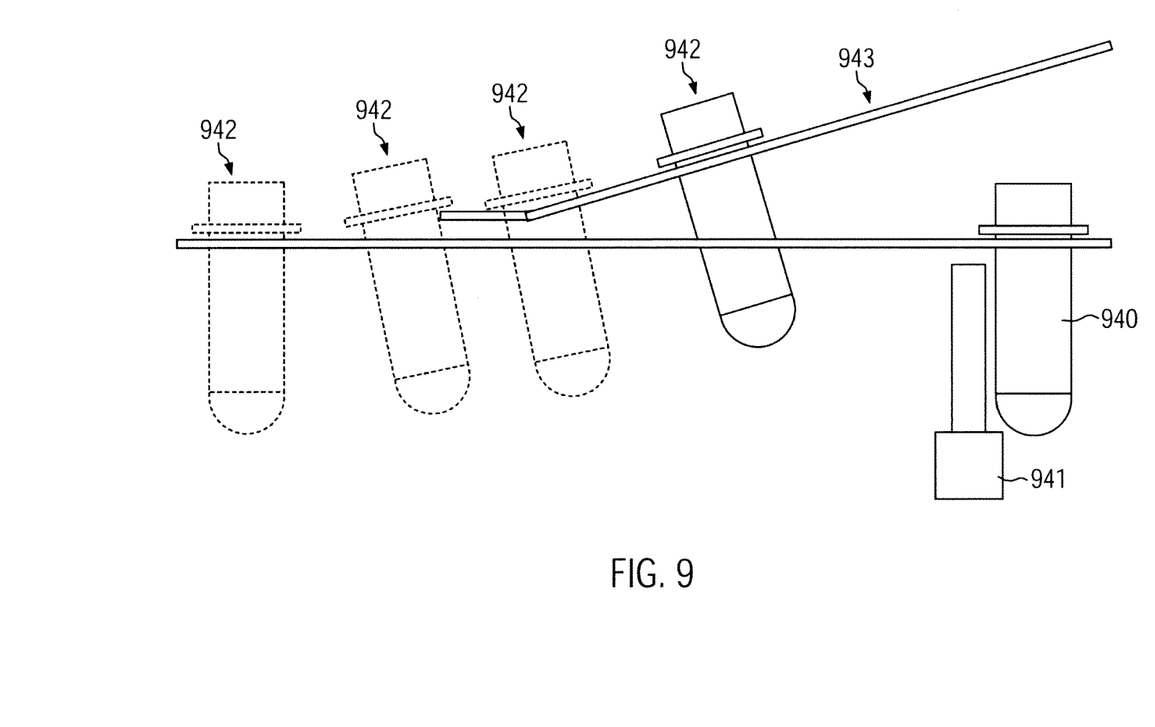
FIG. 9 shows an exemplary introduction means for introducing a measuring device.

FIG. 9 shows details of the introduction device of FIG. 8. The conventional preforms 940 of the blow molding machine can be temporarily kept back by a preform stopper 941. In the meantime, the measuring devices 942 can be introduced into the normal buffer section for preforms via an introduction device 943. The buffer section shown in FIG. 9 at which the preform stopper is disposed is, for example, inclined at an angle between 20° and 30° to the horizontal. The angle the buffer section includes with the feed of the measuring devices is, for example, between 5° and 45°.

Figure 10:
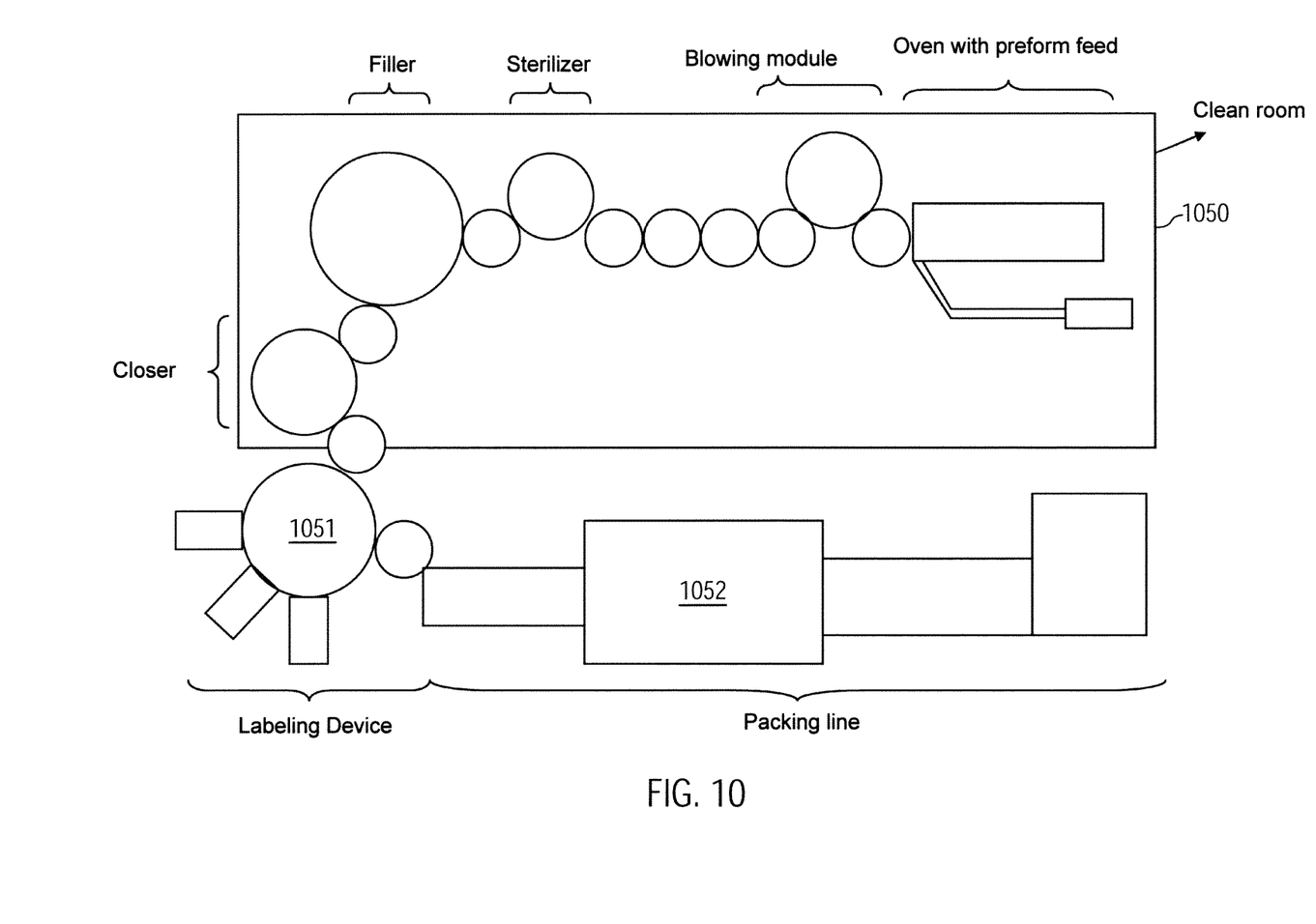
FIG. 10 shows an illustration of a system, comprising a blow molding machine, a filling machine, and/or a labeling device, in which an exemplary measuring device can be used.

FIG. 10 shows an exemplary plant for which an above-described measuring device can be used. In particular, a clean room 1050 is shown, comprising a blow molding machine and a filling machine. After, a closer, the articles can be supplied to a labeling device 1051 and finally to a packing line 1052.

A measuring device can be moved through the plant in a test run in advance as well as in-line, that means during production. In the latter case, the adjustments of the parameters of the plant can be verified and optionally controlled during operation. The production can also be stopped, and then an above-described measuring device can be transported through the plant.

It will be understood that features mentioned in the above described embodiments are not restricted to these special combinations and are also possible in any other combinations. In particular, a measuring device can comprise several measuring elements which can detect the same or different parameters.

The invention claimed is:

1. Measuring device for determining at least one parameter value for the operation of a blow molding machine, a filling machine, and/or a labeling device, comprising:
    at least one measuring element for determining the at least one parameter value;
    a preform dummy,
    the at least one measuring element being arranged in and/or at the preform dummy, and
    at least one adjustment means attached at least one of in or at the perform dummy and embodied such that certain container treatment units can be adjusted from a first format to a second format during transport of the measuring device through a filling plant,
    wherein the preform dummy has the shape of a preform and comprises a supporting ring.

2. Measuring device according to claim 1, and a transmitting element for transmitting the at least one parameter value determined by the measuring element to an evaluation element.

3. Measuring device according to claim 1, and a storage element for storing the at least one parameter value determined by the measuring element.

4. Measuring device according to claim 3, and an interface, for connecting the storage element with an evaluation element and/or an external storage element.

5. Measuring device according to claim 4, and a power supply element for supplying the at least one measuring element, the transmitting element, the storage element, and/or the interface with electric energy.

6. Measuring device according to claim 1, wherein the at least one parameter value is a pressure value, a temperature value, a value of a force, a value of a moment, a position value, a radiation value, a period, a flow rate, a format value, a speed value, a number of germs, and a combination thereof.

7. Measuring device according to claim 4, wherein the interface is a USB interface.

8. Measuring device for determining at least one parameter value for the operation of a blow molding machine, a filling machine, and/or a labelling device, comprising:
    at least one measuring element for determining the at least one parameter value;
    a preform dummy;
    the at least one measuring element arranged in the preform dummy and/or at an outer and/or inner surface of the preform dummy; and
    at least one of an inner diameter and an outer diameter of a mouth portion of the preform dummy being variably adjustable;
    wherein the preform dummy has the shape of a preform and comprises a supporting ring.

\* \* \* \* \*